United States Patent [19]

Reinecke

[11] 4,116,492
[45] Sep. 26, 1978

[54] BRAKE VALVE ARRANGEMENT FOR A TWO-CIRCUIT BRAKE SYSTEM

[75] Inventor: Erich Reinecke, Beinhorn, Fed. Rep. of Germany

[73] Assignee: WABCO Westinghouse GmbH, Hanover, Fed. Rep. of Germany

[21] Appl. No.: 738,601

[22] Filed: Nov. 3, 1976

[30] Foreign Application Priority Data

Nov. 3, 1975 [DE] Fed. Rep. of Germany ....... 2548973

[51] Int. Cl.² .......................... B60T 8/22; B60T 15/12
[52] U.S. Cl. ..................................... 303/22 R; 303/40; 303/52
[58] Field of Search ................. 303/6 C, 22 R, 22 A, 303/40, 52, 53, 54, 56

[56] References Cited

U.S. PATENT DOCUMENTS

| | | | |
|---|---|---|---|
| 3,183,042 | 5/1965 | Bueler | 303/54 |
| 3,580,646 | 5/1971 | Ternent | 303/54 |
| 3,934,942 | 1/1976 | Klimek | 303/6 C |
| 3,964,794 | 6/1976 | Scholz | 303/6 C |
| 3,966,263 | 6/1976 | Thrush | 303/6 C |
| 3,976,171 | 8/1976 | Belart | 303/52 |
| 4,025,123 | 5/1977 | Oberthuer | 303/22 R |

FOREIGN PATENT DOCUMENTS

| | | | |
|---|---|---|---|
| 1,935,537 | 2/1971 | Fed. Rep. of Germany | 303/53 |
| 2,361,257 | 6/1975 | Fed. Rep. of Germany | 303/22 R |
| 1,140,410 | 1/1969 | United Kingdom | 303/22 R |

*Primary Examiner*—Edward R. Kazenske
*Attorney, Agent, or Firm*—R. S. Visk; R. W. McIntire, Jr.

[57] ABSTRACT

A two-circuit brake system, operable either pneumatically or hydraulically, for motor vehicles including an operator-controlled brake valve for effecting supply of brake-operating pressure via a vehicle load-responsive device for regulating brake-operating pressure to the rear axle according to vehicle load, and a relay valve responsive to such regulated pressure for effecting supply of brake-operating pressure to the front axle according to a predetermined ratio. The relay valve includes certain pressure area members which may be replaced by others for varying the rear axle to front axle braking-pressure ratio to suit the particular vehicle on which it is used, and the operator-controlled brake valve is operable for maintaining effectiveness of at least one of the brake circuits, either front or rear, in the event of failure of the other.

2 Claims, 4 Drawing Figures

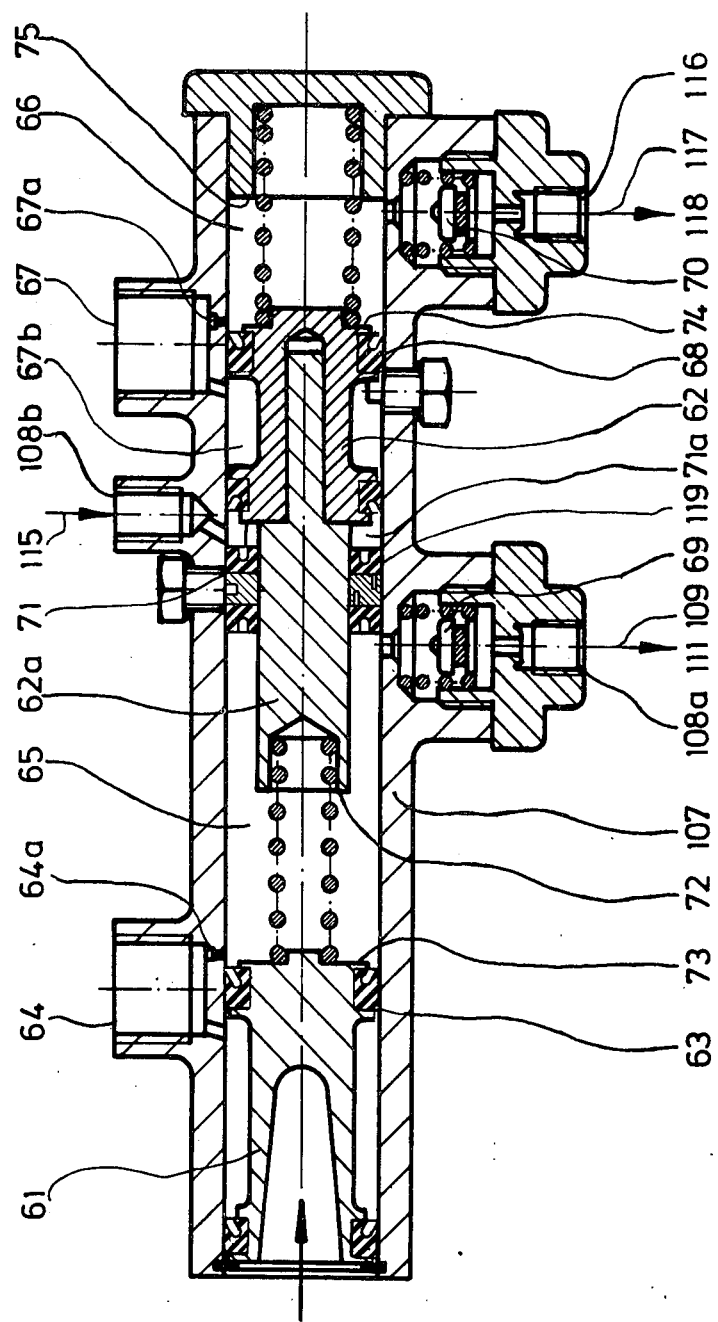

BRAKE VALVE ARRANGEMENT FOR A TWO-CIRCUIT BRAKE SYSTEM

BACKGROUND OF THE INVENTION

Automatic load-dependent brake power regulators are used to adjust the brake pressure in the brake cylinders to the respective load condition of a vehicle. This adjustment takes place automatically in that, by means of the brake power regulator, the respective spring deflection which is determined by the axle load or the pressure in the respective air spring bellows which is determined by the axle load, regulates the level of the brake pressure which can be controlled by the brake valve. In the case of commercial vehicles it has been customary for many years to regulate the brake pressure — in particular on the rear axle, since it is subjected to particularly strong variations with respect to the axle load as a result of variable load conditions.

Since, however, these variable load conditions affect not only the axle load of the rear axle but also more or less the axle load of the front axle, it proved advisable to control also the braking forces acting upon the front-wheel brakes in a certain proportion to the braking forces acting upon the rear-wheel brakes. Also, for many vehicles it is necessary to simultaneously control the front axle in order to meet the legal requirements relative to the brake coordination between the motor vehicle and trailer.

When simultaneously controlling the front axle there is an additional advantage in that the brake linings of the motor-vehicle brakes wear off more evenly in all the brake ranges.

In the meantime, for the joint control of the brake circuit of the front axle, there have become known solutions wherein for the front axle a special intermediate valve is used which is influenced by the rear axle brake pressure. These valves require a considerable additional outlay. In addition, there arose the problem that, in the event of a breakdown of the rear-axle brake circuit, only a very low brake pressure is available for the brake circuit of the front axle. This brake pressure is, however, insufficient to obtain the legally required braking effect on the front-wheel brakes in the event of a brake-circuit failure.

As is known, in order to eliminate this problem, the aforesaid regulating valve is provided with an additional, expensive and by no means trouble-free control mechanism which in the event of a loss of pressure in the rear axle brake circuit switches the regulating valve of the front-axle brake circuit to full pressure flow.

The published German application No. 2,248,923 discloses such an expensive control device for the rear-axle brake circuit, in which case there is provided, for the joint control of the front-axle brake circuit, a special control device which has a constant transmission ratio and which is acted upon by the pressure — as controlled in the rear-axle brake circuit — in such a manner that the transmission ratio can be changed in accordance with the controlled pressure in the rear-axle brake circuit. At the same time this control valve is provided with an additional control device, a switch valve, which is acted upon as a function of the pressure in the rear-axle brake circuit, selectively by the controlled pressure in the rear-axle brake circuit or by the uncontrolled pressure of the front-axle brake circuit, in such a manner that, when there is pressure in the rear-axle brake circuit, the controlled pressure thereof is operative and, when the rear-axle brake circuit is without pressure, the pressure in the front-axle brake circuit is operative, i.e. in the event of the rear-wheel brakes breaking down, the front-wheel brakes become fully operative.

U.S. Pat. No. 3,904,253 discloses a load-dependent control device for the rear-axle brake circuit whose pressure generator is in the form of a tandem master cylinder. However, in this control system the front-axle brake circuit is not jointly controlled, but, in the event of a breakdown of the front-axle brake circuit, the brake-power regulating action of the pressure generator in the rear-axle brake circuit is merely fully or partially eliminated so as to obtain a stronger braking effect of the rear-wheel brakes by supplying the full or at least a higher brake pressure to the rear-axle brake circuit.

SUMMARY OF THE INVENTION

The object of the invention is to reduce the high expenses resulting from a separate regulating valve for the front axle as well as to avoid the disadvantages enumerated in the preceding paragraphs.

Briefly the invention, which is for a two-circuit brake system, includes an operator-actuable brake valve which, when actuated, affects supply of operating pressure for both brake circuits through a vehicle load-responsive valve device for regulating such pressure according to vehicle load, such load-regulated pressure being transmitted directly to the brakes of one axle (the rear axle, for example) while at the same time also being transmitted to a relay valve portion of the brake valve for controlling the pressure of operating pressure supplied to the brakes of the other axle by establishing a predetermined ratio between the two pressures supplied to the respective axles, said relay valve portion including changeable pressure area elements whereby said pressure ratio may be varied according to the requirements of any particular vehicle. The operator-controlled brake valve is also constructed so that in the event of failure of one brake circuit, either front or rear, the other brake circuit remains fully operative. Thus, the vehicle will usually have some braking.

BRIEF DESCRIPTION OF THE DRAWINGS

FIG. 4 is an elevational view in section, of a hydraulic tandem master brake cylinder having the arrangement characteristic of the invention.

DESCRIPTION AND OPERATION

Figure 1:
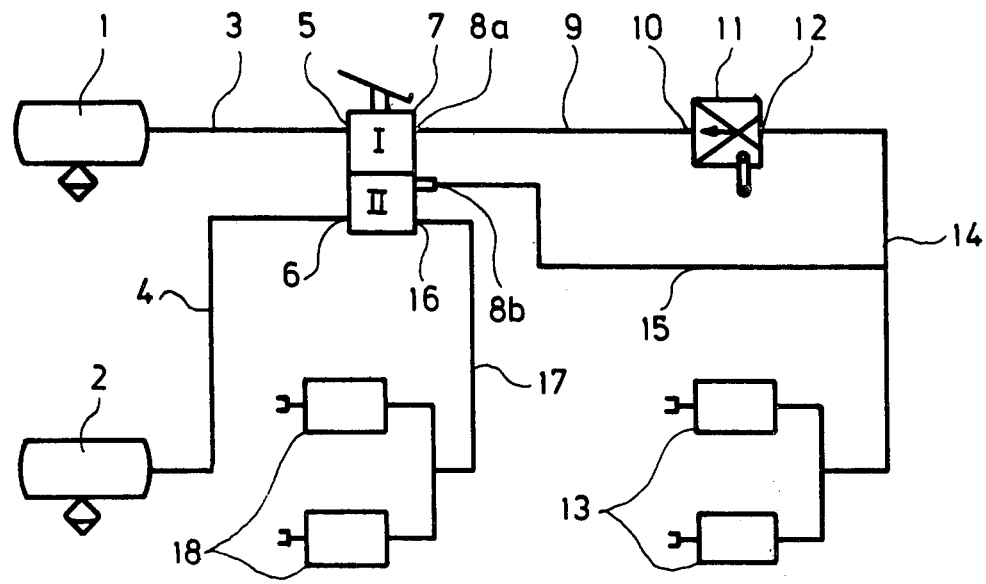
FIG. 1 is a schematic view of the brake system according to the invention, with a pneumatic tandem brake valve.

As shown in FIG. 1, supply lines or pipes 3 and 4 lead from the compressed-air supply tanks 1 and 2 to supply connections or inlets 5 and 6 of a two-circuit automotive pedally or manually operable brake valve device 7. A delivery connection or outlet 8a of a brake circuit I of the brake valve 7 is connected, via a delivery or pipe 9, with a control connection or inlet 10 of an automatic vehicle load-dependent brake pressure regulator 11 whose control connection or outlet 12 is connected, via a rear brake pressure or line 14, with rear pneumatic wheel-brake cylinders 13 of the rear axle. In addition, the control connection 12 of the brake pressure regulator 11 is connected, via a shunt line or pipe 15, with a shunt connection or inlet 8b provided according to the invention on the brake valve 7. A delivery connection or outlet 16 of a brake circuit II of the brake valve 7 is directly connected by a delivery line or pipe 17 to pneumatic wheel-brake cylinders 18 of the front axle.

Figure 2:
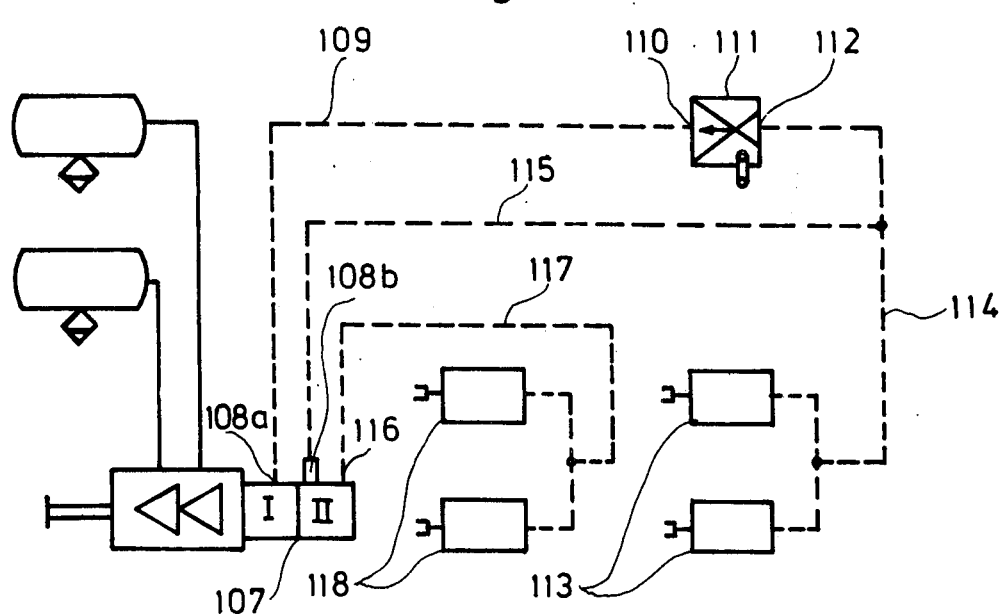
FIG. 2 is a schematic view of the brake system according to the invention, with a hydraulic tandem master brake cylinder.

The brake system, according to FIG. 2, is a pneumatically operated hydraulic system wherein a hydraulic tandem master cylinder is actuated by a known pneumatic tandem pressurizing cylinder or by a known pneumatic tandem booster. Since the invention is only concerned with the hydraulic part of the system, a description of the pneumatic part is omitted here.

A delivery connection or outlet 108a of a brake circuit I of a tandem master brake cylinder 107 is connected via a delivery line or pipe 109 to a control connection or inlet 110 of an automatic load-dependent hydraulic brake pressure regulator 111 whose control connection outlet 112 is connected, by way of a rear brake pressure line or pipe 114, to rear hydraulic wheel-brake cylinders 113 of the rear axle. In addition, the control connection 112 of the brake pressure regulator 111 is connected via a shunt line or pipe 115 to a shunt connection or inlet 108b provided according to the invention on the tandem master brake cylinder 107. A delivery connection or outlet 116 of a brake circuit II of the tandem master brake cylinder 107 is directly connected by a delivery line or pipe 117 to front hydraulic wheel-brake cylinders 118 of the front axle.

The descriptions given with reference to the schematic diagrams in FIGS. 1 and 2 only describe the systems of the invention in general. Before describing the operation of these systems, it is — for a fuller understanding — first necessary to deal in more detail with the construction of the two-circuit automotive brake valve 7 and that of the tandem master brake cylinder 107 and their arrangement according to the invention, reference being had to the diagrammatic representations in FIGS. 3 and 4.

Figure 3:
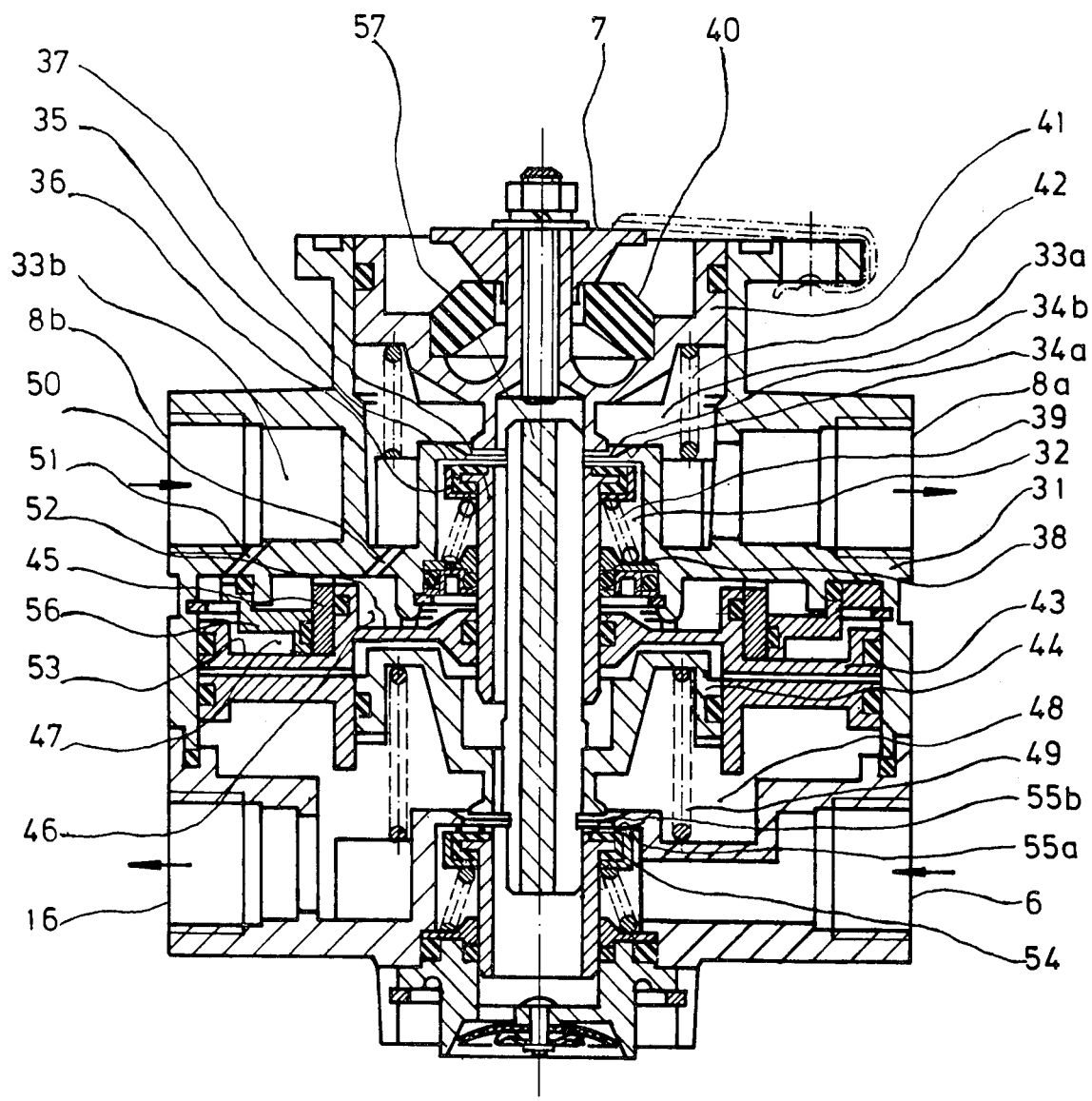
FIG. 3 is an elevational view, in section, of a pneumatic tandem brake valve having the arrangement characteristic of the invention.

Operation of the two-circuit automotive brake valve 7 in tandem arrangement, as shown in FIG. 3, is effected by shifting a control lever by which two inlet and outlet valves, each associated with a respective brake circuit, are operated by means of a stepped piston and a relay piston.

Generally brake valve 7 comprises a mechanically operated brake valve (circuit I) and a relay valve (circuit II) which is controlled by the brake pressure of circuit I and which, in case circuit I breaks down, can be mechanically operated by means of a friction coupling which is known through German patent No. 1,151,745.

The following description explains the construction of brake valve 7 with its devices which are necessary for its functioning within the system of the invention.

A valve housing 31, whose interior is subdivided into an upper section (brake circuit I) and a lower section (brake circuit II), contains in each section valve elements for controlling the pressure-medium flow between the respective inlet and outlet openings. The upper section of the housing 31 is subdivided into an admission or supply pressure chamber 32, to which inlet 5 is connected by passage means not shown, and, according to the invention, two compressed-air delivery and control pressure chambers 33a and 33b, respectively, the chamber 33a being separated from chamber 32 by a valve seat 34a which, when the brake is not being operated, is closed by a combination inlet and outlet or supply and exhaust valve element 35. This valve element is received by holding ring or valve retainer 36 at the upper end of a valve case or carrier 37 which is movably disposed in annular sealing means 38. An annular guide member of the sealing means 38 supports the lower end of a spring 39 whose upper end engages with the holding ring 36 of the valve case 37 so as to sealingly press the valve element 35 against the valve seat 34a.

A stepped piston 41, movably disposed in the compressed-air chamber 33a, is tensionally connected (in suitable manner not shown) with a brake foot pedal of brake valve 7 by means of a resilient element 40. When the brake is not actuated, piston 41 is kept in its upper position by a spring 42 located between the bottom of the chamber 33a and the underside of the piston 41. When the stepped piston 41 is moved downwardly by operation of the foot pedal, it engages in a sealed relation with the valve element 35 and establishes a communication between the admission chamber 32, connected with the supply connection 5 — not shown here — and the compressed-air chamber 33a, so that the pressure medium can flow, via the outlet 8a and delivery pipe 9, to the brake pressure regulator 11 and thence to the brake cylinders 13 of circuit I.

In the lower part of the valve housing 31 a relay piston assemblage, consisting of an upper piston 43 and a lower piston 44, separates two intermediate control chambers 46 and 47, which themselves are separated by an intermediate ring 45, from a second compressed-air chamber 48. The two pistons 43 and 44 are movably interconnected, the piston 44 being — when the brake is not being actuated — pushed upwardly by a spring 49 engaging with an annular lower face of the piston 44, so that when the pressure medium flows from the compressed-air chambers 33a and 33b through the passages 50 and 51 to the control chambers 46 and 47, the working or pressure surfaces 52 and 53 are acted upon, respectively, and the pistons 43 and 44 move downwardly as one unit. When the lower end of the piston 44 engages with a combination inlet and outlet or supply and exhaust valve element 54 and moves so that both the piston and the valve element occupy a braking position, the inlet or supply valve 55a opens so as to connect the supply line 4 with the brake or delivery line 17 via the supply inlet 6 and the delivery outlet 16. When the pressure in the compressed air chamber 48 rises, it acts upon the surface areas of the pistons 43 and 44 thus moving them upwards as a unit until the inlet valve opening 55a and an outlet valve opening 55b cover one another. So, this valve operates essentially in the same manner as the valve, described at the beginning, of circuit I.

After having described above the construction of the two-circuit automotive brake valve 7 as a whole without particular emphasis on the novel features of the invention, the modifications, as they are related to the invention, will be dealt with in detail hereinafter for a fuller understanding of the invention.

In the present two-circuit automotive brake valve there is provided a mechanically operated piston for the first circuit, there being provided for the normal operation of the valve for the second circuit a pneumatically controlled relay piston which is controlled by the brake pressure of the first circuit. For the purpose of controlling the relay piston, its control chamber communicates through a passage with the brake pressure chamber of the first circuit. It is essential that, in the event of a loss of brake pressure in the first circuit, mechanical actuation, the brake pedal being pushed down entirely, makes it possible to supply the brake pressure so as to fully operate the second circuit and, accordingly, to obtain the auxiliary braking effect as prescribed.

The invention solves the problem of the joint control of the front axle as follows:

A division of the working surface of the relay piston assemblage, which is acted upon by the brake pressure, into two working surface areas 52 and 53 results in a division of the control chamber into the chambers 46 and 47 separated from one another by the intermediate ring 45.

The working surface 53, which is connected to line 15 via control inlet 8b, chamber 33b, and passage 51, is acted upon by the controlled brake pressure of the rear-axle brake cylinder 13, the working surface 52 being subjected to the uncontrolled brake pressure supplied thereto via supply inlet 5, admission chamber 32, and passage 50.

Since a supplementary ring 56 and the intermediate ring 45, upon the annular surface of which the uncontrolled brake pressure of the brake circuit I acts also and which together with the working surface 52 forms a joint surface, are exchangeable together, it is possible to selectively change the ratio of the front-axle brake pressure regulation to the rear-axle brake pressure regulation as a result of a change in the dimensions of the two working surfaces 52 and 53 of the relay piston assemblage. Thus, any desired brake power regulation ratio between the two axles can be obtained by installing an intermediate ring 45 and a ring 56 having the appropriate dimensions. The construction of the valve is such that it is also possible to exchange the intermediate ring 45 and, likewise, the ring 56 at any time as desired. The ratio of the working area 52 to the working area 53 is thus changed only by exchanging the aforesaid two rings, which means that the dimensions of the relay piston assemblage 43/44 of the invention are always the same for all brake valves mounted under different conditions, which offers advantages for a large production series and easy exchange possibilities later on.

The solution according to the invention makes it possible to provide for the front axle a pressure which may lie between the controlled pressure of the rear axle and the pressure which is uncontrolled, such as prevails in admission chamber 32.

If now for whatever reason the rear-axle brake circuit should fail to function and as a result all pressure on the corresponding working surface areas of the relay piston of the front-axle brake circuit is eliminated, then — as already described — when fully braking by means of mechanical actuation, the supply of the full brake pressure in the front-axle brake circuit remains intact. This also applies in case, in the event of a breakdown of the mechanical control of the load-dependent brake pressure regulator, the regulator shifts to the 'empty' position in spite of a full vehicle load and under normal braking conditions with a heavily loaded vehicle and the regulator in the 'empty' position, the auxiliary braking effect as prescribed cannot be obtained.

The function of the two-circuit automotive brake valve having the arrangement of the invention is described hereinafter with reference to FIGS. 1 and 3:

By actuating the brake pedal or brake valve 7, the stepped piston 41 moves downwards, closes the outlet 34b and opens the inlet 34a. As a result the compressed air coming from the tank 1 via line 3 and connection 5 — not shown in FIG. 3 — flows from chamber 32 into chamber 33a via connection 8a and line 9 to the brake power regulator 11 and thence, controlled in accordance with the axle load, through line 14 into the brake cylinders 13 of the rear axle. At the same time, pressure is being built up in chamber 33a under the stepped piston 41 as well as, via passage 50, in the chamber 46 acting upon the working surface 52 of the relay piston 43/44. The second working surface 53 of the relay piston is acted upon — by way of line 15, connection 8b and chamber 33b — by the controlled pressure for the rear axle. Under the influence of the pressures acting upon the two working surfaces 52 and 53, the relay piston, which consists of the pistons 43 and 44, moves downwardly against the force of the spring 49; this causes outlet 55b to be closed and inlet 55a to be opened. Compressed air flows from connection 6 via connection 16 into the brake cylinders 18 of the front axle to which air is supplied in accordance with the controlling pressure in the chambers 46 and 47.

The pressure being built up in chamber 33a acts upon the underside of the stepped piston 41 which as a result moves upwardly against the force of the spring element 40 until there is an equilibrium of forces on both sides of the piston 41. In this position the inlet 34a and the outlet 34b are closed (neutral position).

Similarly, under the influence of the rising pressure in chamber 48 acting, in conjunction with spring 49, upon the underside of the pistons 43 and 44, the latter move upwardly until the neutral position is reached here as well, i.e. until the inlet 55a and the outlet 55b are closed.

In case circuit II breaks down, circuit I continues to operate in the manner as described. When circuit I breaks down, the control of the relay piston ceases to function; circuit II is mechanically put into operation, as follows:

The foot pedal of brake valve 7 is depressed beyond the normal amount necessary for normal pressurization of admission chamber 32, so that piston 41 is pushed downwardly until it contacts an insert or stem 57, which is fixedly attached to the piston 44. Further downstroke of insert 57 causes piston 44 to move downwardly as well. Outlet 55b closes, the inlet 55a opens. Thus, in spite of the breakdown of circuit I, circuit II is fully operative.

The invention described hereinbefore in connection with a two-circuit automotive brake valve in a two-circuit air brake system applies in a similar manner also to a two-circuit or tandem master cylinder in a hydraulic two-circuit brake system.

The functional diagram of FIG. 2 shows that for the solution of the basic idea of the invention the same circuit arrangement is used as that of the functional diagram, shown in FIG. 1, of an air brake system.

After having described the invention in full detail in connection with an air brake system and the brake valve associated therewith, the two-circuit master brake cylinder 7 will — as an additional example in connection with a hydraulic system — be described with reference to FIG. 4 only insofar as this is necessary for an understanding.

The normal operation of the two-circuit or tandem master cylinder 7 is as follows:

When actuating a plunger rod piston 61 in the direction of a working piston 62/62a, then first a primary sealing member 63 travels over a balance hole 64a, closing a pressure chamber 65 of circuit I; the brake fluid is subject to the pressure transmitted to it. Since a fluid put under pressure transmits it uniformly in all directions, a pressure chamber 66 of circuit II receives, via the working piston 62/62a, the same pressure conditions after a primary sealing member 68 has passed over a balance hole 67a. At the same time, the fluid trapped in the pressure chamber 65 passes, via a bottom valve 69 and connection 108a, into brake circuit I, and the fluid trapped in the pressure chamber 66 passes, via a bottom valve 70 and connection 116, into brake circuit II.

The fluid reservoirs serving as the supply chamber for the brake fluid are connected with the tandem master cylinder 7 by way of a supply connection or inlet 64 for brake circuit I and by way of a delivery connection or outlet 67 for brake circuit II.

In accordance with the invention, the working piston 62/62a, which consists of two parts, is provided with an annular piston surface or shoulder area 71 which, via the connection 108b, is connected with the connection 112 of the brake pressure regulator 111 which supplies the controlled brake pressure. Consequently, according to the invention, both the uncontrolled pressure and the controlled pressure act jointly upon the working piston 62/62a via a piston surface area 72 and the piston surface area 71, respectively. Also, in this case, it is possible to selectively change the ratio of the front-axle brake pressure regulation to the rear-axle brake pressure regulation by changing the dimensions of the two piston surface areas 71 and 72 or by replacing the piston body (62a) and a ring (119).

Also with this master cylinder 107, in the event of one of the two circuits breaking down, the other brake circuit is kept operational, so that the auxiliary braking effect is obtained as prescribed by law.

If for example a leak should occur in brake circuit I, then, when pushing down the brake pedal, it is not possible to build up pressure in the pressure chamber 65, since the brake fluid escapes at the point of leakage. In this case a surface 73 pushes on the surface 72 and, via the working piston 62, transmits the pressure mechanically to the pressure chamber 66. Thus, brake circuit II remains operative.

Should there occur a leak in brake circuit II, then no pressure can be produced in the pressure chamber 66. The working piston 62 moves forwards without resistance until a surface 74 touches a surface 75. Thus, brake circuit I remains operative.

I claim:

1. A two-circuit brake system for use with motor vehicles having at least two axles, said brake system comprising:
   (a) a housing;
   (b) a brake valve device in said housing;
   (c) manually operable means for actuating said brake valve device;
   (d) first piston valve means connected to said manually operable means and operable, upon movement of the manually operable means up to a certain amount, for controlling the amount of pressure in a first pressure chamber in the brake valve device;
   (e) a relay piston assemblage operable to a braking position in response to pressure in said first pressure chamber and in a control pressure chamber acting jointly on a pressure surface area of the relay piston assemblage for controlling the amount of pressure in a second pressure chamber, said relay piston assemblage having a pair of intermediate control chambers formed therein adjacent said pressure surface area and connected, respectively, to the pressures in said first mentioned control chamber and in said first pressure chamber, said intermediate control chambers being separated from one another in a pressure-tight relationship,
   (f) said first pressure chamber being connected, via a vehicle load-responsive brake pressure regulator, with brake cylinders on one of said axles for effecting braking thereof according to vehicle load, and said second pressure chamber being connected with wheel brake cylinders on the other of said axles for effecting braking thereof according to the amount of pressure in the second pressure chamber, the braking ratio between said one axle and said other axle being in accordance with the ratio of the pressure in said first and control chambers relative to the pressure in said second chamber; and
   (g) a supplementary ring fixed concentrically in said housing and on the relay piston assemblage and which, along with an intermediate ring disposed within and concentrically relative thereto, acts to separate said intermediate control chambers in said pressure-tight relationship and to partly define the amount of said pressure surface area, being exposed to each of said intermediate control chambers said supplementary and intermediate rings being replaceable with respective rings of different dimensions so as to change the amount of said pressure surface area being exposed to each of said intermediate control chambers.
   (h) said relay piston assemblage being tensionally connectable through a stem member with the manually operable means and being operable, in the event of failure of fluid pressure in said first chamber and upon movement of said manually operable means in excess of said certain amount, to its said braking position.

2. A two-circuit brake system according to claim 1, wherein the annular surface area of the intermediate ring is acted upon by the pressure in the first pressure chamber and forms, together with a portion of the pressure surface area of the relay piston assemblage adjacent one of said intermediate control chambers, the entire pressure surface area of the relay piston assemblage acted upon by the pressure of the first chamber.

* * * * *

UNITED STATES PATENT AND TRADEMARK OFFICE
CERTIFICATE OF CORRECTION

PATENT NO. : 4,116,492
DATED : September 26, 1978
INVENTOR(S) : Erich Reinecke

It is certified that error appears in the above-identified patent and that said Letters Patent are hereby corrected as shown below:

Column 8, line 31, after "assemblage" insert --,-- line 36, after "surface area" delete --,-- line 37, after "chambers" insert --,-- line 42, after "chambers" delete "." and insert --,-- line 57, after "first" insert --pressure--

Signed and Sealed this

Twenty-second Day of May 1979

[SEAL]

Attest:

RUTH C. MASON
Attesting Officer

DONALD W. BANNER
Commissioner of Patents and Trademarks